July 3, 1962 J. W. SCHUKRAFT 3,042,442
BATTERY LIFTER

Filed Dec. 15, 1959 2 Sheets-Sheet 1

INVENTOR
John W. Schukraft.
BY Thomas W. Y. Clark
ATTORNEY

July 3, 1962  J. W. SCHUKRAFT  3,042,442
BATTERY LIFTER
Filed Dec. 15, 1959  2 Sheets-Sheet 2
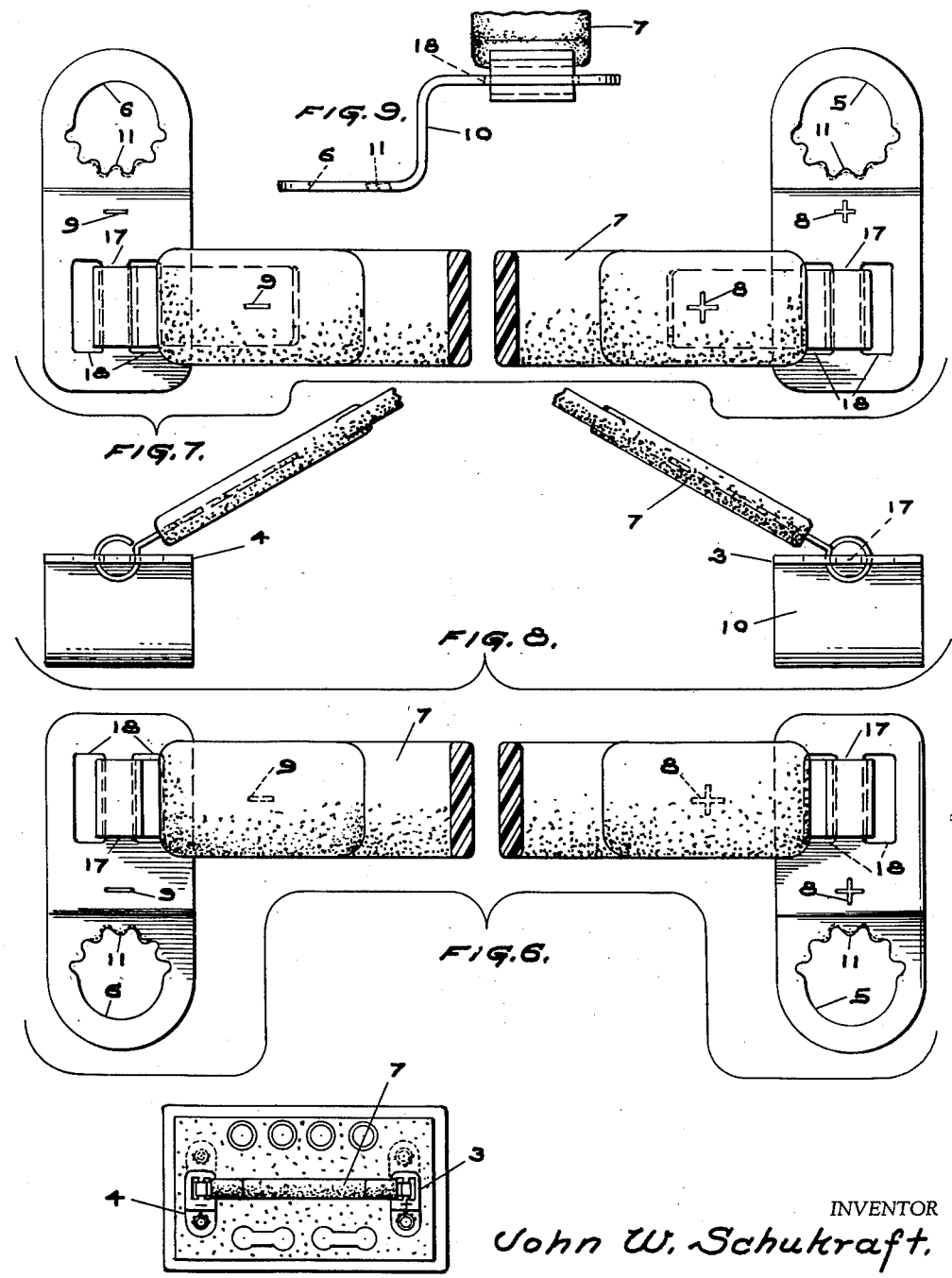
INVENTOR
John W. Schukraft,
BY Thomas W. J. Clark
ATTORNEY

United States Patent Office 3,042,442
Patented July 3, 1962

3,042,442
BATTERY LIFTER
John W. Schukraft, Towson, Md., assignor to The Murray Corporation, a corporation of Maryland
Filed Dec. 15, 1959, Ser. No. 859,788
10 Claims. (Cl. 294—92)

This invention relates to a battery lifter of the flexible strap type in which the lifting plates are connected to the strap, in a novel manner to allow tilting of the plates relative to the strap to permit multiple uses of the strap in one modification so that batteries wtih diagonal posts separated a considerable distance or a lesser distance may be lifted with equal facility by simply inverting the strap and in another modification so that batteries which have their posts on one of either side may be lifted from substantially the center of gravity of the battery, in order to avoid tilting it and perhaps spilling the acid from it.

Storage batteries are substantially universally made with truncated conical terminal posts, with the positive post being larger than the negative post and in order to lift these batteries with apertured plates on strap ends, the apertures in the plates must be of a size corresponding to those of the post size so that large apertures in the plates are required for the positive post end of the strap and smaller apertures in the plate are required on the negative end of the strap.

It is among the objects of the instant invention to make a lifter which will extend the strap when gripping battery posts, which are close together, without having the strap so bowed that the pull is substantially vertical and squeezes the hand and so that batteries with posts separated at a greater distance may be lifted by the same strap simply by inverting the strap while retaining the post engaging plates with the same side uppermost.

Another object of the instant invention is to place spurs on the inside of the post engaging apertures in the plates and to place these spurs on the side of the aperture which is lifted upwardly, upon lifting the strap, so that in the slight sliding movement the plate aperture is given on the post, the spurs will tend to dig into the post to obtain a firm hold.

In another modification the lifter of the invention is intended to lift batteries when both terminal posts are on the same side of the battery, the plates are then so mounted on the ends of the strap as to swing readily with a cylindrical clasp hinging means attached to the strap ends so that simply by reversing the strap and tilting the apertured plate, a large post may be engaged by the positive end of the strap with its large apertured plate regardless of which side of the center of gravity of the battery the large post may be placed on. Since the battery engaging plates are offset from the same side of the strap in this modification a similar relationship exists for engaging the smaller or negative post of the battery.

Other objects and advantages of this invention will be apparent from the following description and accompanying drawings forming a part hereof and in which:

FIGURE 5 is a top plan view of a battery with the posts on one side engaged by the lifter of the second modification of this invention.

FIGURE 6 is a top plan view of the second modification of the lifter with the plates turned to engage the posts as shown in FIGURE 5.

FIGURE 7 is a top plan view of the second modification with the plates turned to engage the posts of a battery on the side shown in dotted lines in FIGURE 5.

FIGURE 8 is a side elevational view of the lifter as shown in FIGURE 7.

FIGURE 9 is a fragmentary end view of the lifter from the left as shown in FIGURE 7.

In the drawings similar numerals refer to similar parts throughout the several views.

Figure 1:
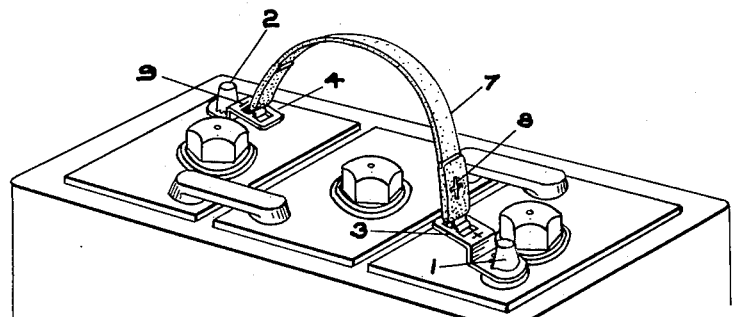
FIGURE 1 is a perspective view of a battery with the posts on opposite sides engaged by a diagonally placed strap.

The battery of FIGURE 1 has positive terminal post 1 and negative terminal post 2 which are respectively engaged by plates 3 and 4 by their respective large aperture 5 and small apertures 6 in a transverse plane. The strap 7 and plates are marked with the positive and negative signs 8 and 9 as shown to readily identify the large and small apertures adapted to fit over the large or small posts. The plates are offset upwardly as shown at 10 in order to be safely out of the way of any other parts of the battery spaced from the posts. This offset relationship also tends to maintain the marked face of the plates upwardly when hanging from the strap regardless of which side of the strap may be turned upwardly. Before the offset bend 10 is given to the plates, the plate apertures are punched and at the same time the punching cuts the spurs 11 projecting centrally of the aperture. Then when the offset bend 10 is placed in the plates, these spurs adjacent the bend are slightly thinned and tend to point downwardly to give sharp post engaging surfaces or points to the spurs at their top edges so that when the plate is tilted upwardly as shown in dotted lines in FIGURE 3 the spurs dig into the side of the post and not only obtain a better lift hold upon the post and corresponding battery but also on partial penetration of the post, prevent the plates from turning on the posts in a horizontal plane.

Figure 2:
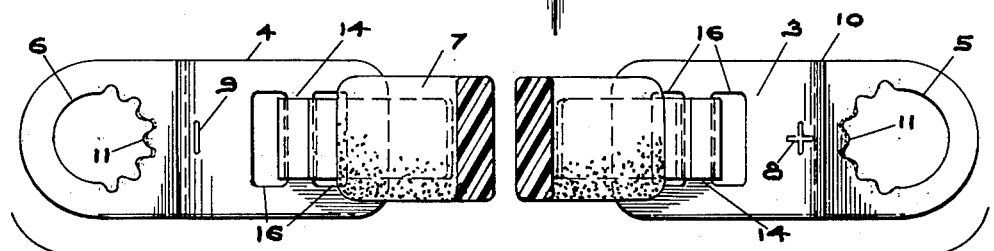
FIGURE 2 is a top plan view of the lifter of this first modification, partly in section.
Figure 3:
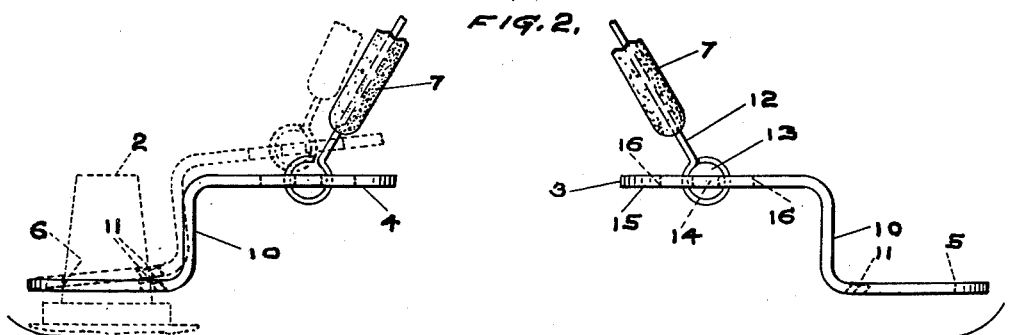
FIGURE 3 is a side elevational view of this modification showing one end of the strap in lifting engagement with the battery, with the strap partly broken away.
Figure 4:
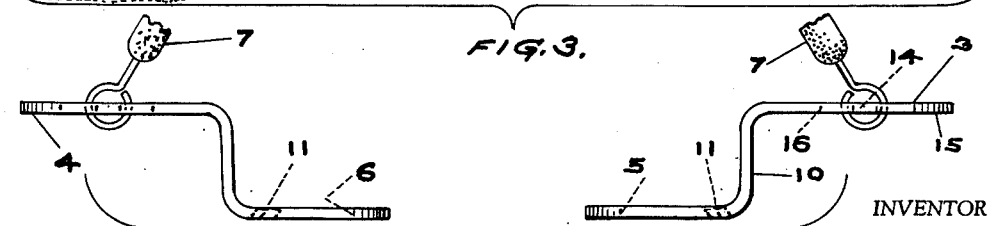
FIGURE 4 is a side elevational view of the lifter of this modification, with the strap partly broken away, and with the plates turned to lift a battery with closely spaced posts.

In the first modification of this invention as shown in FIGURES 1 to 4 and in which the apertured plates project in line with the length of the strap, the plates may extend to their full length as shown in FIGURES 1, 2 and 3 and conveniently lift a battery with posts substantially as far apart as this extension of the strap and plates will allow. When the posts are close together and this extension of the plates is not required the strap may be inverted, in which event the strap center is oppositely bent, and the apertured ends of the plates will point inwardly as shown in FIGURE 4 and the close posts may be readily grasped by the plates. When the strap is inverted and angularly sloped from the plates the lower ends of the plates by gravity point inwardly at a slight angle to the vertical. It will be apparent from FIGURE 3 that if the right plate is released from the battery post and the left plate is turned horizontally through an angle of 180 degrees on post 2, it will be in the position shown at the left in FIGURE 4 and the strap is then swung over to the right, inverted, that the other plate will then be in position to engage the post on the right, also as shown in FIGURE 4. This inversion of the strap also presents the spurs to engage the opposite sides of the posts to obtain a firm grip to lift the battery, should the posts on the other side have been injured by acid or fumes. In this modification it will be apparent that the strap is placed diagonally of the battery so that the center of gravity of the battery is substantially under the hand lifting the strap from its center, in which event of course the strap bends down from the hand and projects in straight lines from the hand down to the plates.

In both modifications of the invention the strap has a cylindrical clasp hinge member or pitman head 12 projecting from its end in which the pivot opening 13 of the hinge is normal to the length of the strap and this pivot opening is axially parallel to the strap. The plate has a bar 14 formed near the center of the offset portion 15 by stamping out the rectangular openings 16. The bar and member 12 form a hinge to permit the plate to swing about the strap end to either side but the portion of the plate at each side of the bar 14 limits the swinging of the plate around the strap end to less than 180 degrees or less than a straight angle.

In the modification of the FIGURE 5 to 9, the bar 17 is placed at right angles to the position of the bar in the first modification. By placing the bar 17 in line with the length of the plate in the second modification, the plates project to one side of the strap member as shown in the views of this second modification. By projecting to one side the plates may engage posts as shown in FIGURE 5 on one side of the battery and because the spurs dig into the posts they prevent the plates from twisting on the posts when lifting the strap, which holds the battery from substantially its center of gravity. The spurs prevent the turning which would normally take place for the strap tends to twist to the shortest distance between two points, that is, tends to twist to a straight line regardless of the ring angular initial mounting of the plates on the strap. If the posts are on the opposite side of the battery as shown in dotted lines in FIGURE 5, with the large posts on the right as shown in this figure, the battery may still be lifted by simply inverting the strap, not changing it from end to end, and the plates will swing over themselves leaving the offset side up and be ready for engagement with the posts as shown in dotted lines in FIGURE 5, and as shown in FIGURE 7. The offset of the plates tends to maintain the top side of the plates up regardless of the inversion of the strap.

In this modification of course it will be apparent that the openings in the strap plates to form the bars 17 are made in the positions shown at 18, and the plate sides adjacent the bar 17 limit the swing of the plates to less than a straight angle on the strap end, the apertures in the plates project parallel to the hinge pivot, whereas, in the first modification, they project normal to it.

It is understood that modifications within the scope of the claims may be made in the construction shown without departing from the invention.

What is claimed as new and is desired to be secured by Letters Patent is:

1. A battery lifter comprising:
   (a) a flexible strap and a battery post engaging plate at each end,
   (b) each plate being elongated and having a substantially vertical intermediate portion and laterally and oppositely extending substantially horizontal end portions offset from the intermediate portion, one said end portion being apertured adjacent the said intermediate portion to engage in a transverse plane with a battery post,
   (c) pivot hinge means at the other plate end including a pintle in the said other plate end spaced within the margins of the said other plate end and a tubular member around said pintle fixedly connected to the said other strap end with the tubular member axis being substantially in the plane of the strap end and transverse to the strap length, the strap end being rigid adjacent its connection with the tubular member,
   (d) the strap end, tubular member and plate margins limiting the swing of the plate around the strap end to less than a straight angle, the strap projecting upwardly from the plate, the hinge means pivoting the plate to the strap end to swing the plate about an axis normal to the strap length to either side of the pintle of the hinge pivot means to engage a post with substantially equal facility on either side of the said pintle,
   (e) whereby the apertured plates at each end of the strap are adapted to engage the battery posts by a vertical dropping thereover with the same side of the plate up when either side of the strap is up.

2. The lifter of claim 1 in which the apertured end has spurs on the side of the aperture adjacent the said intermediate portion projecting toward the aperture center to vertically grip the post when the apertured plate end is canted from the horizontal plane.

3. The lifter of claim 1 in which the apertured end has spurs on the side of the aperture adjacent the said intermediate portion projecting toward the aperture center to vertically grip the post when the apertured plate end is canted from the horizontal plane, the tops of the said spurs being directed downwardly adjacent the said intermediate portion to project centrally of the opening the upper edge of said spurs.

4. The lifter of claim 1 in which the plates extend from the strap ends in a direction with the apertured plate ends in line with the strap length.

5. The lifter of claim 1 in which the plates extend from the strap ends in a direction with the apertured plate ends normal to the same side of the strap length.

6. A battery lifter comprising:
   (a) a flexible strap and a battery post engaging plate at each end,
   (b) each plate being elongated and apertured adjacent one end to engage in a transverse plane with a battery post, the plate other end being offset upwardly from and substantially parallel to the apertured end,
   (c) pivot hinge means on the plate offset end, a part of the hinge means projecting upwardly and being connected rigidly to the strap end, the strap end being rigid adjacent said connection, the hinge means pivoting the plates to the strap ends to swing about an axis normal to the strap length to either side of the pivot of said pivot hinge means with substantially equal facility on either side of the said pivot and
   (d) means on the offset end of each said plate to limit the pivotal movement of the hinge means and strap to less than a straight angle,
   (e) whereby the offset apertured plates at each end of the strap are adapted to engage battery posts by a vertical dropping thereover with the offset ends of the plates up when either side of the strap is up.

7. The lifter of claim 6 including on each plate spurs projecting toward the aperture center from the side of the aperture adjacent the offset end.

8. The lifter of claim 6 in which the plates extend from the strap ends in a direction with the apertured plate ends in line with the strap length.

9. The lifter of claim 6 in which the plates extend from the strap ends in a direction with the apertured plate ends normal to the same side of the strap length.

10. A battery lifter comprising:
    (a) a flexible strap and an elongated plate at each end,
    (b) means at one end of each plate to engage a battery post while preventing rotation of said means relative to the post, the plate other end being offset upwardly from and substantially parallel to the said one end,
    (c) pivot hinge means on the plate offset end, a part of the hinge means projecting upwardly and being connected rigidly to the strap end, the strap end being rigid adjacent said connection, the hinge means pivoting the plates to the strap ends to swing about an axis normal to the strap length to either side of the pivot of said pivot hinge means with substantially equal facility on either side of the said pivot and (d) means on the offset end of each plate to limit the pivotal movement of the hinge means and strap to less than a straight angle, (e) whereby the offset plates with post engaging means at each end of the strap are adapted to engage battery posts by vertical dropping thereover with the offset ends of the plates up when either side of the strap is up.

References Cited in the file of this patent

UNITED STATES PATENTS

| | | |
|---|---|---|
| 1,908,926 | Severance | May 16, 1933 |
| 1,938,158 | Steele | Dec. 5, 1933 |
| 2,199,378 | Wells | Apr. 30, 1940 |
| 2,224,561 | Wiora | Dec. 10, 1940 |
| 2,503,794 | Brown | Apr. 11, 1950 |
| 2,697,630 | Roberts | Dec. 21, 1954 |
| 2,756,092 | Grypma | July 24, 1956 |
| 2,816,791 | Pinkerson | Dec. 17, 1957 |